Patented Nov. 21, 1933

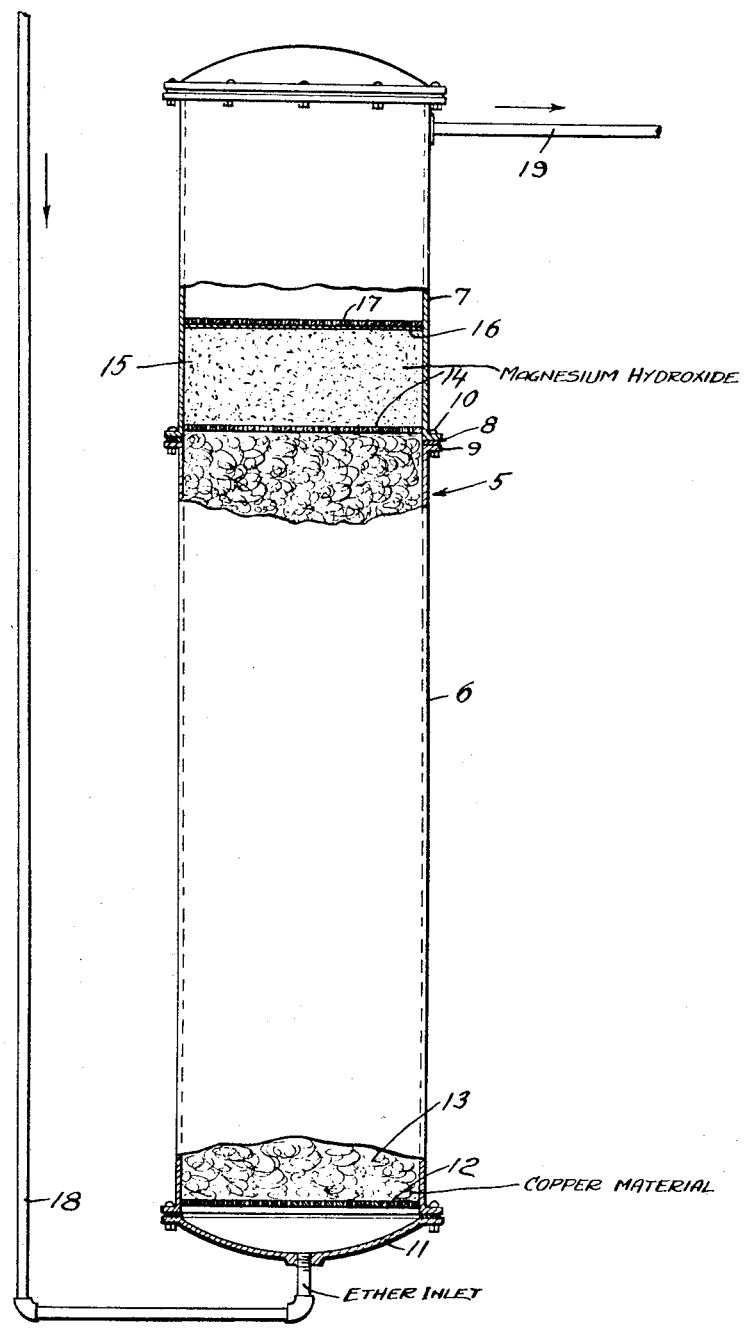

1,935,658

UNITED STATES PATENT OFFICE 1,935,658

METHOD FOR PURIFYING ETHER

Ferdinand W. Nitardy, Brooklyn, N. Y., assignor to E. R. Squibb & Sons, Brooklyn, N. Y., a corporation of New York Application July 22, 1932. Serial No. 623,958

9 Claims. (Cl. 260—151)

This invention relates to the purification of ether, and more particularly to the removal of oxygen and oxidation products from ether intended for anæsthetic use.

Ether containing peroxides is excluded from use for anæsthesia by the standard specification (U. S. P.). Inevitably, however, ether is exposed during preparation and handling to atmospheric oxygen which readily combines therewith to form peroxides and/or intermediate oxidation products.

It is the object of the present invention to provide a method whereby ether free from oxygen and oxidation products can be prepared.

Metallic copper combines with oxygen and in the presence of metallic copper any oxygen dissolved or otherwise present in ether will be consumed and converted into cuprous oxide. The cuprous oxide readily decomposes peroxides and/or intermediate oxidation products of ether, thus permitting the production of ether free from undesirable impurities resulting from oxidation.

In carrying out the invention, I prepare ether by the standard method in which ethyl alcohol is treated with sulphuric acid or by any other available method. The ether thus prepared is then subjected to intimate contact with copper in any suitable apparatus. Oxygen and oxidation products are removed from the ether which can be packaged then in suitable containers to ensure the preservation of the ether in its oxygen-free condition.

The intimate contact of the ether with copper can be effected in various ways, for example, by conveying it through copper pipes or pipes lined with copper. Such pipes should be of relatively small diameter and great length to ensure sufficient contact between the copper and the ether. Alternatively the ether can be placed in a copper container or one having a copper lining and stirred until sufficient surface contact is assured. The surface area may be multiplied by providing fins on the wall of the container and on the stirring device or otherwise.

Preferably, however, I employ a tower or other suitable container which may be filled with copper wool or shot or pieces of copper arranged so as to permit the ether to pass readily through the container and to contact with the copper. Conveniently the ether may be supplied at the bottom of the container and may be removed at the top, passing continuously through and in contact with the copper to ensure the removal of oxygen and oxidation products.

If the ether contains peroxides, the action of copper results in the formation of a small amount of organic acids, including probably acetic acid, which are undesirable impurities in anæsthetic ether. Such acids, if present, can be removed readily by causing the ether to contact, by percolation or otherwise, with magnesium hydroxide, thereby converting the organic acids into insoluble salts which are retained or are readily separated from the purified ether. In the practical application of the invention, dry hydrated magnesium hydroxide is moistened with sufficient water so that it can be rubbed through a coarse sieve to produce a rather coarse powder. The latter is dried in a current of warm, preferably $CO_2$—free air, and can be placed in a suitable container such as a tower through which the ether is passed after it leaves the vessel containing copper. The product thus obtained is free from oxygen, peroxides and/or intermediate oxidation products and is also free from organic acids.

The ether may be stored then in a container of copper or having a copper lining until it is placed in suitable receptacles for transportation and distribution. The transportation receptacles should be such as to avoid any oxidation of the ether. They may, for example, have an interior coating of copper. The ether is thus preserved in its purified condition until it is used.

The object of the invention is accomplished by the provision of ample contact between the copper and ether during the purification. The elements are exposed area of copper for surface contact and time. These may be varied, depending upon the nature of the apparatus used. The elements of surface contact and time can be adjusted easily to meet varying proportions of oxygen and oxidation products in the ether treated. Thus with a given area of exposed surface of the copper, the flow of the ether can be increased or diminished. If the time of treatment is to be decreased, an added amount of exposed surface of metallic copper can be provided. The action of magnesium hydroxide in removing organic acids is similarly controlled.

I do not wish to be limited to any explanation of the mechanism of the reaction involved in the method as described. My investigation indicates, however, that the oxidation of ether to form peroxides proceeds through stages involving the production of intermediate oxidation products. These are not easily detected by methods of determining peroxides in ether and often develop peroxides after the ether has been tested and found to be free from peroxides.

These intermediate oxidation products, together with the peroxides, are decomposed by copper or cuprous oxide during the operation of the procedure as herein described. Any free oxygen is likewise removed by combination with the copper. Consequently the ether obtained by the practice of the invention is free from oxygen and oxidation products and will remain in its purified form until it is again exposed to oxidizing conditions.

The invention affords an important improvement inasmuch as it enables the manufacturer of ether to deliver to the medical profession an ether which contains no traces of oxygen or oxidation products. Such ether can be used without possible danger of injuring the patient through the presence of dangerous peroxides.

As an example of the procedure and apparatus best adapted to accomplish the purpose of the invention, reference is made to the accompanying drawing, which is a diagrammatic illustration of a suitable apparatus.

Referring to the drawing, 5 indicates a tower of copper or other suitable metal which, if magnesium hydroxide is used, may be made in two sections 6 and 7 connected, with a liquid tight soft metal gasket 8, between the flanges 9 and 10. The lower end is closed by a cover 11. A perforated plate 12 supports a mass 13 of copper wool, shot or pieces of copper in any form adapted to expose a large surface. A perforated plate 14 is disposed above the copper mass. If magnesium hydroxide is not used, the upper section of the tower can be eliminated.

It is preferable, however, to support on the plate 14 a mass 15 of granular magnesium hydroxide with a layer 16 of filter paper and a perforated plate 17. Thus the ether after passing through the mass of copper will contact with magnesium hydroxide to remove any organic acids which may have been formed.

The ether is supplied through a pipe 18 to the bottom of the tower and circulates upwardly therein, being withdrawn through a pipe 19 at the top of the tower. The rate of circulation can be controlled by any suitable means to regulate the flow of ether through the apparatus.

The flow of ether is adjusted to afford a sufficient period of contact in view of the oxygen to be removed and the area of copper exposed. The period of contact can be adjusted readily and the operation may be continuous.

Various changes may be made in the details of operation and in the apparatus used without departing from the invention or sacrificing any of the advantages thereof.

I claim:

1. The method of removing oxygen and oxidation products from ether which comprises subjecting a bulk supply of ether containing the impurities to intimate contact with metallic copper and maintaining the contact until the oxygen and oxidation products have been removed.

2. The method of removing oxygen and oxidation products from ether which comprises causing the ether to travel in intimate contact with metallic copper until the oxygen and oxidation products have been removed.

3. The method of removing oxygen and oxidation products from ether which comprises causing the ether to travel in intimate contact with a relatively large exposed surface area of metallic copper until the oxygen and oxidation products have been removed.

4. The method of removing oxygen and oxidation products from ether which comprises agitating the ether in the presence of a relatively large exposed surface area of metallic copper until the oxygen and oxidation products have been removed.

5. The method of removing oxygen and oxidation products from ether which comprises percolating the ether through a porous mass of metallic copper having a relatively large exposed surface area until the oxygen and oxidation products have been removed.

6. The method of removing oxygen and oxidation products from ether which comprises subjecting a bulk supply of ether containing the impurities to intimate contact with metallic copper, maintaining the contact until the oxygen and oxidation products have been removed, and thereafter causing the ether to contact with magnesium hydroxide.

7. The method of removing oxygen and oxidation products from ether which comprises percolating the ether through a porous mass of metallic copper having a relatively large exposed surface area until the oxygen and oxidation products have been removed, and thereafter causing the ether to contact with magnesium hydroxide.

8. The method of removing oxygen and oxidation products from ether which comprises causing the ether to travel in intimate contact with metallic copper until the oxygen and oxidation products have been removed, and thereafter, in order to neutralize acids contained in the ether, causing the ether to contact with an ether-insoluble base which forms ether-insoluble salts with acetic acid.

9. The method of removing oxygen and oxidation products from ether which comprises subjecting a bulk supply of ether containing such impurities to intimate contact with metallic copper, maintaining the contact until the oxygen and oxidation products have been removed, and thereafter, in order to neutralize acids present in the ether, causing the ether to contact with a base which forms with the acids salts which are insoluble in the ether, and then separating such salts from the ether.

FERDINAND W. NITARDY.